Jan. 15, 1963 A. G. STIMSON 3,073,223
VIEWFINDER INDICATORS FOR PHOTOGRAPHIC CAMERAS
Filed May 15, 1961

Allen G. Stimson
INVENTOR.

BY R. French Smith
Robert W Hampton
ATTORNEYS

United States Patent Office 3,073,223
Patented Jan. 15, 1963

3,073,223
VIEWFINDER INDICATORS FOR PHOTOGRAPHIC CAMERAS
Allen G. Stimson, Rochester, N.Y., assignor to Eastman Kodak Company, Rochester, N.Y., a corporation of New Jersey
Filed May 15, 1961, Ser. No. 109,970
9 Claims. (Cl. 95—10)

The present invention relates to photographic cameras having built-in photocells, and more particularly concerns apparatus for selectively adjusting the elevation of the vertical acceptance angle of the photocell relative to a photographic subject, and for identifying in a viewfinder the vertical relation of the photocell to the subject.

It has been observed that a photoelectric exposure control system in a camera can be designed to give optimum exposure for either foreground subjects or for background subjects, but not necessarily for both. It also has been observed that the subject of major interest to photographers in most photographs is in the foreground. For this reason many cameras are designed to expose such foreground subjects properly by aiming the photocell slightly downward. This of course causes overexposure of a bright background, for example a sunlit mountain, when the foreground is in shadow. For proper exposure of a distant subject the photocell should be "aimed" approximately at that subject.

It is a primary object of this invention selectively to aim a photocell in a camera at a preferred horizontal band of a photographic subject, i.e., a preferred horizontal band of the entire photographic scene viewed by the camera operator.

Another object of the invention is to identify in the viewfinder of a camera the elevation of a photocell relative to a photographic subject.

Other objects of the invention will appear from the following description, reference being made to the accompanying drawings, wherein.

Figure 1:
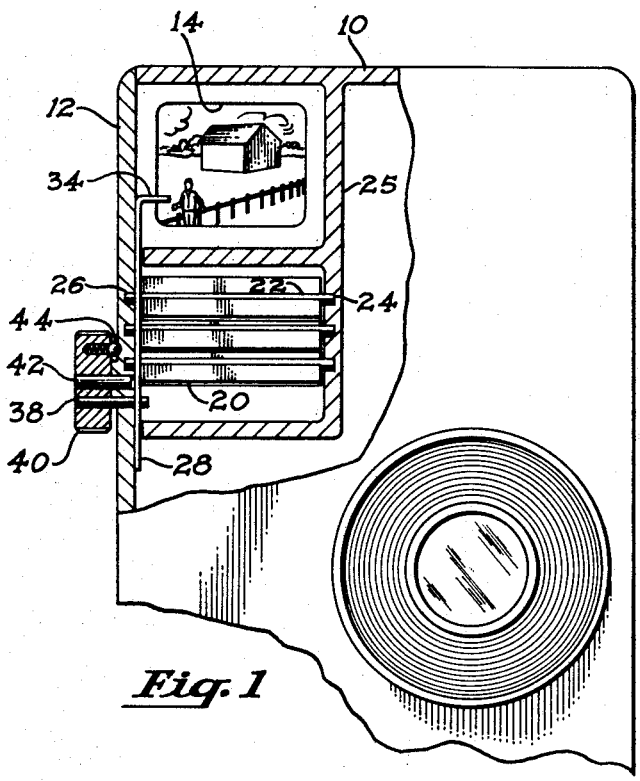
FIG. 1 is a front view, partly in section, of a camera embodying a preferred form of the invention.

Referring to the drawing, a camera body 10 has a removable side cover 12 and an enclosed viewfinder window 14. A photoelectric cell 16 is on a frame member 18 and responds to light entering the front of the camera and passing through a plurality of louvers 20. The louvers are rotatably mounted relative to the camera body by respective shafts 22. The two ends of each shaft 22 are mounted in respective recesses 24 and 26. These recesses are formed in a frame member 25 and in the side cover 12, respectively.

It can be seen that the louvers 20 determine the vertical acceptance angle of the photocell, and that the angle of louvers 20 with respect to the camera determines the elevation of this vertical acceptance angle with respect to a horizontal plane when the camera is held in the position shown, for normal photography; i.e., the turning of knob 40 simultaneously moves both the upper and lower limits of the vertical acceptance angle in the same direction, either up or down, to limit the exposure of the photocell effectively to light from a selected horizontal band of the photographic subject. The lower angle is controlled as follows:

The forward edge of each louver engages a respective notch or recess 27 of a control plate 28, which is mounted for vertical sliding motion between frame member 18 and upper and lower frame members 30 and 32. A slot 36 in plate 28 is adapted to receive a pin 38 mounted eccentrically on a knob 40, which is rotatably mounted by a shaft 42 on side cover 12. Manual rotation of knob 40 therefore adjusts the vertical position of control plate 28 and the angular relation of louvers 20 to the horizontal plane.

A ball and spring detent mechanism 44 on the inner surface of knob 40 cooperates with complementary cavities on the outer surface of side cover 12 for yieldably maintaining the knob at any of a plurality of selected angular positions corresponding to louver angles. The identity of the selected position of knob 40, and therefore the vertical relation between the photographic subject and the vertical acceptance angle of the photocell, may be brought to the attention of the operator by a series of index marks 46, which may cooperate with a fixed mark 47 on the outer surface of side cover 12.

A bent ear 34 on the upper end of control plate 28 constitutes a pointer and extends into alignment with the viewfinder window 14. The length of control plate 28 is such that pointer 34 identifies the horizontal band of the photographic subject to which the photocell is preferentially exposed by virtue of the angular disposition of louvers 20.

Figure 2:
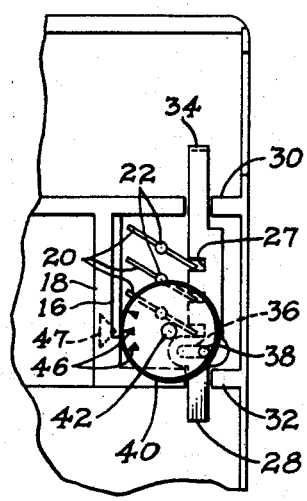
FIG. 2 is a partial right side view of the camera with the side cover removed, illustrating the embodiment shown in FIG. 1.
Figure 3:
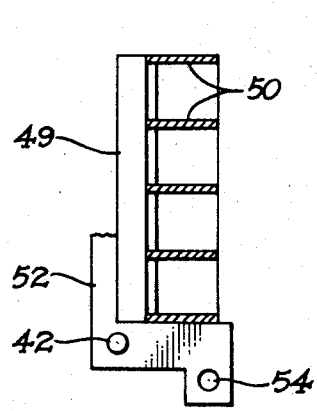
FIG. 3 is a view similar to FIG. 2, illustrating an alternate embodiment of the invention.

FIG. 3 illustrates an alternate embodiment of the invention, in which the vertical acceptance angle of photocell 49 is determined by a plurality of mutually parallel, horizontally disposed louvers 50 mounted integrally therewith. The cell and its louvers are supported by a frame member 52, which is pivoted about the previously described shaft 42 (see also FIG. 2). Frame member 52 has an aperture 54 cooperating with pin 38 (FIG. 2) for rocking frame member 52, as well as cell 49 and louvers 50, about shaft 42, thereby changing the elevation of the vertical acceptance angle of the photocell by simultaneously either raising or lowering both its upper and lower limits to expose the photocell effectively to light from a selected horizontal band of the photographic subject. The viewfinder indicator is constructed and operates as shown in FIG. 2.

Figure 4:
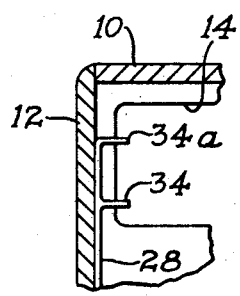
FIG. 4 is a partial front view of the camera illustrating an alternative structure of the viewfinder indicator.

FIG. 4 illustrates an alternate form of indicator, wherein two bent ears 34 and 34a of control plate 28 indicate in the viewfinder the approximate upper and lower limits, respectively, of the vertical acceptance angle of the photocell.

The invention has been described in detail with particular reference to preferred embodiments thereof, but it will be understood that variations and modifications can be effected within the spirit and scope of the invention as described hereinabove and as defined in the appended claims.

I claim:

1. In a camera having a viewfinder, the combination comprising: a photocell; louvers for limiting the vertical acceptance angle of said photocell; manually adjustable selecting means for moving said louvers angularly about at least one axis which is horizontal when said camera is held in a predetermined, normal position for photography, thereby to adjust the vertical relation of said acceptance angle relative to a photographic subject; and an indicator coupled to said selecting means and moved thereby into vertically variable coincidence with said viewfinder for indicating the vertical relation of said acceptance angle relative to said subject.

2. The combination defined in claim 1, wherein said indicator comprises a single pointer maintained by said selecting means in approximate vertical coincidence with the center of said acceptance angle.

3. The combination defined in claim 1, wherein said indicator comprises a pair of pointers maintained by said selecting means in approximate vertical coincidence with the upper and lower limits, respectively, of said acceptance angle.

4. The combination defined in claim 1, with means for moving said photocell angularly along with said louvers.

5. The combination defined in claim 1, wherein said louvers are mounted for angular movement about respective axes.

6. The combination defined in claim 5, wherein said indicator comprises a plate mounted in said camera for vertical sliding movement, said plate having a plurality of recesses, each of said recesses being adapted to receive an edge of a respective one of said louvers for imparting angular motion to said louvers in response to sliding movement of said plate.

7. In a camera with a viewfinder, the combination comprising: a photocell adapted to be illuminated by light from a photographic subject toward which said camera is directed; means for limiting the exposure of said photocell to a predetermined vertical acceptance angle; adjustable selecting means coupled to said limiting means for simultaneously adjusting, in the same direction, the elevation of both the upper and lower limits of said predetermined acceptance angle relative to said camera and said subject; and indicator means coupled to said selecting means for identifying said relative elevation, said indicator means including an indicator visible in said viewfinder and coupled to said selecting means for vertical movement relative to said viewfinder.

8. The combination defined in claim 7, wherein adjustment of said selecting means aims said predetermined acceptance angle at any selected one of a plurality of horizontal bands of said subject, and wherein said indicator identifies said selected horizontal band.

9. The combination defined in claim 8 wherein said indicator comprises a plate mounted in said camera for vertical sliding movement, and wherein said selecting means comprises a knob mounted on an exterior surface of said camera for angular movement about an axis, said knob having an eccentric pin and slot coupled to said plate for imparting vertical sliding movement to said plate in response to angular movement of said knob.

References Cited in the file of this patent
UNITED STATES PATENTS

| | | |
|---|---|---|
| 2,373,391 | Green | Apr. 10, 1945 |
| 2,918,854 | Malek | Dec. 29, 1959 |
| 2,940,369 | Kobayashi | June 14, 1960 |
| 2,959,092 | Faulhaber | Nov. 8, 1960 |
| 2,983,206 | Singer | May 9, 1961 |